Nov. 11, 1969         E. J. HERBENAR         3,477,771
CONTROLLED TORQUE TWIN BEARING ASSEMBLY ADAPTED FOR KINGPIN-TYPE
                       WHEEL SUSPENSIONS
Filed March 14, 1967                              2 Sheets-Sheet 1
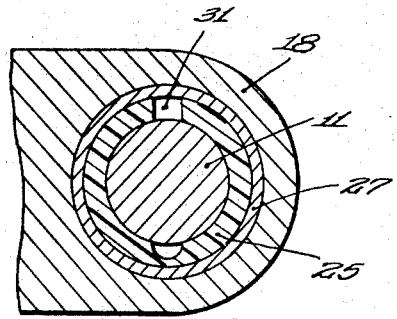
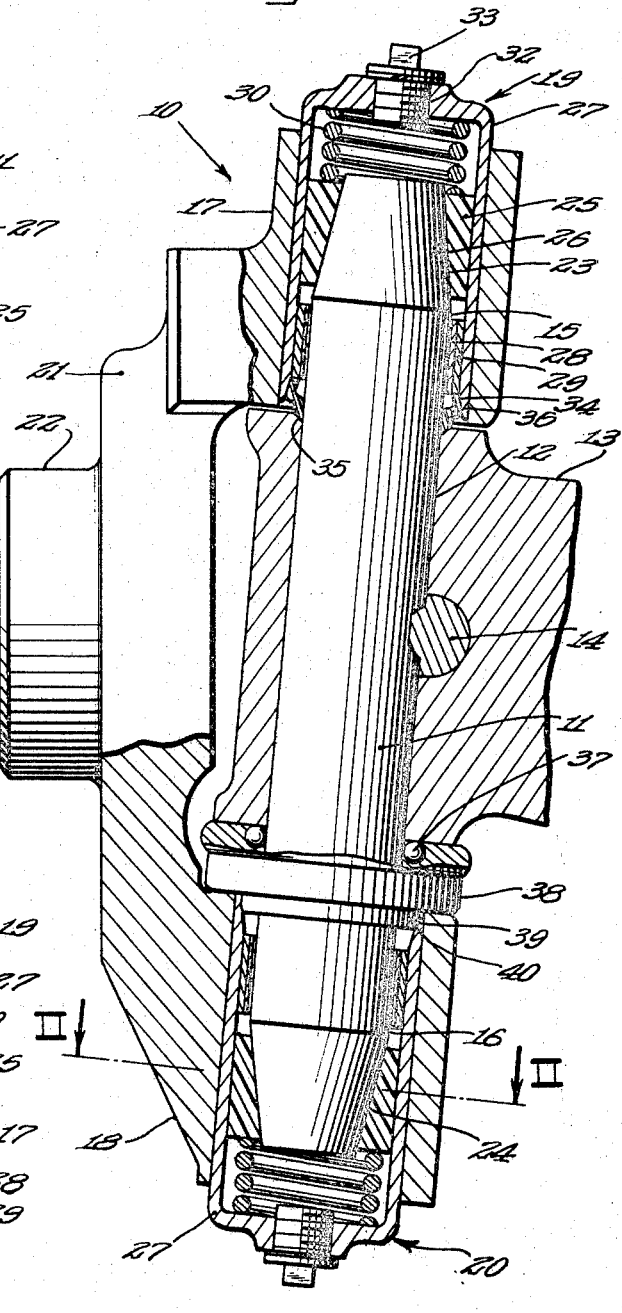
INVENTOR.
Edward J. Herbenar
BY
                                        ATTORNEYS

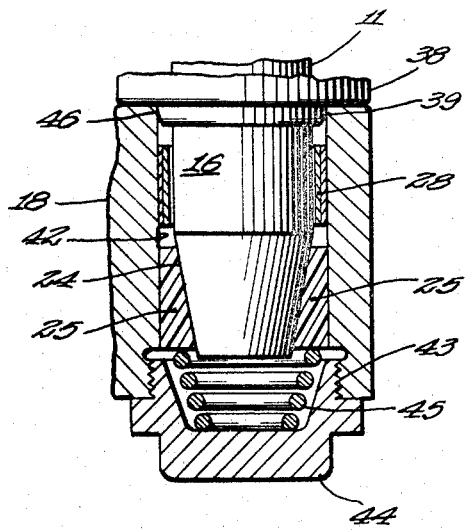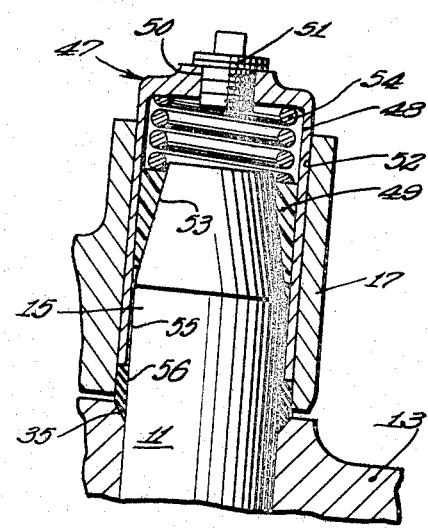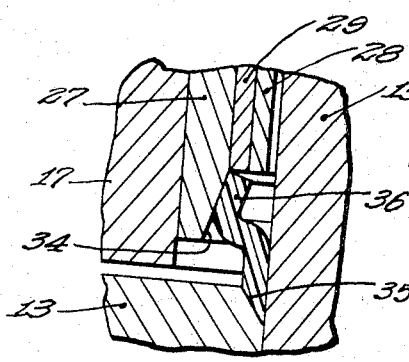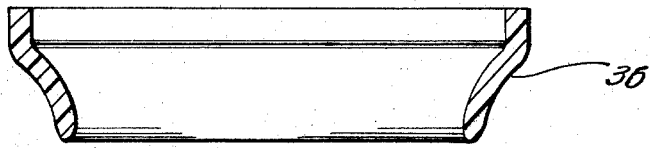

United States Patent Office 3,477,771
Patented Nov. 11, 1969

3,477,771
CONTROLLED TORQUE TWIN BEARING ASSEMBLY ADAPTED FOR KINGPIN-TYPE WHEEL SUSPENSIONS
Edward J. Herbenar, Detroit, Mich., assignor to TRW Inc., Cleveland, Ohio, a corporation of Ohio
Filed Mar. 14, 1967, Ser. No. 623,093
Int. Cl. F16c 25/00, 11/00; B60g 1/00
U.S. Cl. 308—71       10 Claims

ABSTRACT OF THE DISCLOSURE

A kingpin bearing assembly for automotive steering wheel suspensions having a first bearing for normal loading and a second bearing which is engaged upon high or heavy loading on the assembly to support the kingpin during the duration of the heavy load.

THE BACKGROUND OF THE INVENTION

Field of the invention

In kingpin supports for the dirigible or steering wheels of automotive vehicles, this invention pertains to the structure of kingpin bearings which enables a compound bearing to be used, a first bearing for normal loading with the second bearing being utilized during impact or heavy loading of the assembly.

THE DESCRIPTION OF THE PRIOR ART

Adjustable kingpin bearings which are urged into engagement with the kingpin by means of a spring or other resilient means are known in the prior art. As for example in the patent to Milligan, U.S. Patent 1,865,202 issued June 28, 1932. The prior art patents also teach using two different types of bearing structure in a compound bearing, primarily a combination of a sliding bearing and a non-frictional bearing, with some means to switch from the use of the non-frictional bearing to a sliding bearing operation. This type of bearing arrangement is illustrated by the patent to Banerian, U.S. Patent No. 3,058,786 issued Oct. 16, 1962.

The prior art does not teach the use of a compound bearing in a kingpin assembly having a first bearing functioning under normal loading conditions and a second bearing functioning when abnormal loading conditions are present.

SUMMARY OF THE INVENTION

An important feature of this invention is to provide a composite bearing means in a kingpin assembly which will compensate for high impact loading on the assembly. This feature is accomplished by using an adjustable plastic bearing which is in contact with the kingpin and is yieldable when a high load is applied to allow the metallic bearing to support the kingpin during the duration of the loading.

This bearing arrangement may be formed by inserting the bearing in the hollow portion of the bosses of the spindle or this bearing arrangement may be provided by a capsule unit containing both the plastic bearing and the metallic bearing, this unit being inserted in the bosses of the assembly.

Accordingly it is an object of this invention to provide a compound bearing kingpin arrangement which will selectively support both normal loads and abnormal loads.

Another object is to provide a compound bearing unit easily mounted in kingpin assemblies which has a shelf adjusting bearing for supporting normal loads and a second bearing which will be engaged to support high or impact loads.

A still further object is to provide a compound bearing unit in which a self adjusting bearing is carried by a capsule which has a bearing surface to be engaged during high or impact loading.

Yet another object is to provide a compound bearing unit in which an adjustable bearing and means to adjust the bearing are carried by a capsule which supports a second bearing which will be engaged to support heavy or impact loads.

A still further object is to provide a kingpin bearing assembly in which the kingpin end portions are supported in hollow bosses by adjustable bearings during normal loading of the assembly and will engage a second bearing when the assembly is subjected to an abnormal or impact load.

Other objects and advantages of the invention will become apparent from the disclosure in the following specification and in the appended drawings.

A BRIEF DESCRIPTION OF THE DRAWINGS

FIG. 1 illustrates the kingpin bearing assembly of the invention.

FIG. 2 is a section taken on line II—II of FIG. 1.

FIG. 3 illustrates the removal of the bearing assembly in FIG. 1.

FIG. 4 illustrates another embodiment of the bearing arrangement that can be used in the assembly of FIG. 1.

FIG. 5 illustrates a third embodiment of the bearing arrangement which may be used in the bearing assembly illustrated in FIG. 1.

FIG. 6 illustrates an enlarged view of the upper sealing arrangement of the bearing assembly in FIG. 1; and FIG. 7 illustrates the seal used in the arrangement illustrated in FIG. 6.

DESCRIPTION OF THE PREFERRED EMBODIMENTS

In the bearings for kingpin assemblies, the use of plastic, tapered bearings is desirable. However, the size of a plastic bearing which will support the kingpin in its assembly during abnormal loadings is usually too large to be used in most kingpin assemblies. This problem has been overcome by using a concept of a combination or compound bearing, one bearing of which is used for normal loading and a second bearing of which is used during heavy or abnormal loading. The following embodiments use this concept of a combination or compound bearing in a kingpin assembly.

A kingpin assembly generally indicated by the numeral 10, comprises a kingpin 11 which is secured in a bore 12 of an axle 13 by means of a tapered pin 14, the kingpin having two end portions 15 and 16 each supported in hollow bosses 17 and 18 by a compound bearing means 19 and 20. The bosses or housings 17 and 18 are connected together by a yoke 21 which has attached, thereto, a wheel spindle 22.

Each of the end portions 15 and 16 of the kingpin 11 have smooth surfaces which adjacent each end of the kingpin become tapered surfaces 23 and 24, respectively. The compound bearing means 19 and 20, which are substantially identical in structure, support the kingpin by having a first bearing means 25 which has a tapered inner surface 26 that conforms to the tapered surface 23 of the kingpin.

Each of the bearing means 19 and 20 is made up of a closed end or cup-shaped sleeve or housing 27 which carries and supports the first bearing means 25 and a second bearing means 28. The sleeves 27, 27 are disposed in the hollow portion of the bosses 17 and 18 with a tight fit. The second bearing means 28 which is a metallic sleeve bearing may have a backing member 29 and the bearing is carried by the sleeve 27 with a pressed fit. The second bearing means 28 as carried by the sleeve 27 is radially spaced from the surface of the end portion 15 to provide a clearance fit between the bearing and the end portion. The sleeve 27 has a resilient means such as spring 30 positioned between the end portion and the first bearing means. The first bearing means which is made up for a resilient or plastic material, such as nylon, is urged or biased on the tapered surface 23 by the spring 30 and will adjust itself for wear of either of the surfaces 23 or 26. The first bearing means or plastic bearing block 25, as shown in FIG. 2, has a split or slot 31 to allow the bearing to yield radially.

The sleeve 27 has a threaded opening 32 that is closed by a threaded plug 33. The opening has two functions, one is for purposes of lubrication of the bearing and the second for removing the sleeve from the hollow portion of the boss 17 which is described hereinafter.

To prevent direct from entering the sleeve 27, a seal is provided between the sleeve, the kingpin 11 and the axle 13. As best illustrated in FIG. 6, the sleeve 27 has a tapered surface 34 at the end adjacent to the axle 13. The bore 12 of the axle 13 has a countersink 35 adjacent to the boss 17. A sealing member 36 which is illustrated in FIG. 7 in the uncompressed state is disposed about the end portion 15 of the kingpin 11. As assembled, the sealing member 36 is compressed between the countersink 35 and the tapered surface 34 of the sleeve 27 and is folded into a Z-shaped cross-section as illustrated in FIG. 6. This seal 36 provides for the sealing of the interior of the capsule 27 and for the sealing of the kingpin 11 in the upper end of the bore 12 of the axle 13. The lower end of the bore 12 is sealed by means of an O-ring 37 carried by a thrust bearing 38 that is positioned about the kingpin 11 between the boss 18 and the axle 13. The bearing means 20 is sealed by the pressed fitting of the thrust bearing portion 39 into an end 40 of the sleeve of the bearing means 20.

In normal operation the plastic bearing 25 is urged by the spring 30 to conform with the surface 23 of the end portion 15 of the kingpin. The spring 30 exerts a calibrated force on the bearing so that the kingpin may turn relative to the bearing with a controlled turning torque. The normal forces transmitted through the wheel spindle 22 are carried by the plastic bearing to the kingpin 11, and the metallic bearing 28 is not supporting any load. When a large or abnormal force is applied to the spindle 22, the plastic bearing 25 is elastically deformed to allow the bosses 17 and 18 to move radially with respect to the kingpin 11, so that the sleeve bearing 28 engages the kingpin 11 and supports or transmits the load during the duration of the application of the abnormal load. Once the abnormal load has been removed, the plastic bearing 25 will resume its shape and continue to carry the normal load that the spindle 22 will transmit to the kingpin 11, and the sleeve bearing will become disengaged from the kingpin.

The bearing means 19 which comprises the sleeve 27 is referred to as a capsule bearing means. This capsule bearing means may be removed from the hollow portion of the boss 17 by first removing the plug 33. Then a bolt such as 41 is screwed into the bore 32 and as illustrated in FIG. 3 the continual turning of the bolt will apply a force on the end of the kingpin 11 and force the sleeve 27 out of the boss 17. After both capsules are removed, the taper pin 14 is removed to free the kingpin 11 in the bore 12. The capsule 27 may, also, be removed by screwing in a bolt into the bore 32 and then gripping the bolt by pliers and applying a force to pull the capsule from the hollow portion of the boss 17. A third method of removing the capsule bearing means 19 and 20 is to remove the plug 33 from each capsule and remove the tapered pin 14 to free the kingpin in the bore 12. Then a rod is inserted through the opening 32 in capsule 19 and the assembly is placed in an arbor press to apply pressure on the rod to force the kingpin 13 and the opposite capsule 20 out of the boss 18. Then the assembly is turned over and placed in the press to force the kingpin in the opposite direction to push capsule 19 out of the boss 17.

A second embodiment of this invention positions the metallic sleeve bearing and the plastic bearing in a bore of the boss instead of in a sleeve or capsule 27. As illustrated in FIG. 4 which shows the lower boss 18, the plastic bearing 25 which coacts with the tapered portion 24 of the kingpin 11, and the sleeve bearing 28 are positioned in the bore 42 of the boss 18. The sleeve bearing 28 has a pressed fit with the bore 42. The lower end of the bore 42 adjacent to the end of the kingpin 11 has threads 43 which receive a threaded cap 44. Disposes between the cap 44 and the bearing 25 is a spring 45 which has the same characteristic as spring 30. To prevent dirt from entering bore 42, the portion 39 of the thrust bearing 38 has a press fit in the bore 42 at the end 46 which is opposite the threaded end 43.

The embodiment shown in FIG. 4 supports the kingpin 11 in the same manner that the embodiment illustrated in FIG. 1 supports the kingpin. The advantage of the second embodiment over that of the first embodiment is that the bearings 25 and 28 may be individually replaced whereas, in the first embodiment the entire bearing unit including the sleeve 27, and the bearings 25 and 28 must be replaced. The disassembly of the kingpin assembly is accomplished by removing the threaded caps from the bores and then removing the tapered pin 14 to make all components accessible for removal.

A third embodiment of this invention is illustrated in FIG. 5. In this embodiment the kingpin 11 has its end portion 15 supported in the boss 17 by a compound bearing means 47. The bearing means 47 comprises a sleeve 48 which carries a first bearing means 49 which is plastic and is similar in structure to the plastic bearing 25. The sleeve 48 is similar in design to the sleeve 27 and has a threaded opening 50 that is closed with a threaded plug 51. The sleeve 48 is positioned in the bore 52 of the boss 17 and has a tight fit therewith. The plastic bearing 49 has a tapered surface 53 which conforms to the tapered surface 23 of the kingpin 11. The bearing 49 is biased on the surface 23 by a spring 54 which has characteristics substantially the same as the spring 30. The major difference between the sleeve 48 and the sleeve 27 is that the sleeve 48 which may be an aluminum bronze alloy or steel has a surface 55 which functions like sleeve bearing 28. The surface 55 is radially spaced from the surface of the end portion 15 just as the sleeve bearing 28 is spaced. To prevent dirt from entering the sleeve 48, a seal 56 is placed between the end of the sleeve 48 and the countersink 35 of the bore 12. The seal 56 is then compressed.

The embodiment of the bearing means 47 functions in the same manner as the bearing means of the first embodiment. An advantage over the other two embodiments is that by using the surface 55, of the sleeve as a bearing, one part is eliminated.

As is apparent from FIGS. 1 and 5, the embodiment there illustrated has certain advantages over the embodiment shown in FIG. 4. The major advantage is that the bearings may be assembled on the kingpin as a unit thus saving time and labor during the assembly.

I claim as my invention:

1. A kingpin bearing assembly comprising in combination:
   (a) a housing having a hollow portion;
   (b) a kingpin having a cylindrical bearing surface terminating in a tapered bearing surface at the end of the pin, said bearing surfaces being disposed in said hollow portion;
   (c) a metal bearing disposed in said hollow portion adjacent one end thereof, the surface of said metal bearing being radially spaced from the cylindrical bearing surface of said kingpin;
   (d) a plastic bearing disposed in the hollow portion adjacent the other end of said portion, said plastic bearing having a tapered inner surface that is complementary to said tapered surface of said kingpin; and (e) means disposed between the other end of said portion and said plastic bearing to bias said plastic bearing into snug engagement with said tapered bearing surface whereby said engagement is adjusted to compensate for wear in the surfaces;

said plastic bearing being of such nature that when said assembly is subjected to heavy loads, said plastic bearing will resiliently yield sufficiently to allow the kingpin to be supported by said metal bearing during the duration of said load.

2. The assembly according to claim 1 wherein said metal bearing comprises a closed end sleeve disposed in said hollow portion, said plastic bearing and means to bias said plastic bearing being carried by said sleeve.

3. The assembly according to claim 1 which includes a closed end sleeve disposed in the hollow portion, the plastic bearing and the metal bearing being disposed in and carried by said sleeve, said means to bias said bearing being disposed in said sleeve between the closed end and said plastic bearing.

4. An automotive vehicle kingpin assembly comprising an axle, a kingpin secured in an end of the axle having ends projecting above and below the axle, said projecting ends having cylindrical portions with conical end portions, a wheel spindle with a yoke end straddling the axle and having top and bottom hollow bosses receiving the kingpin ends, a thrust bearing between the bottom boss and axle and a compound radial bearing assembly between each boss and kingpin end, each bearing assembly including a sleeve bearing embracing the cylindrical portion of the kingpin end and a split plastic bearing block embracing the conical end portion of the kingpin end, spring means urging the bearing blocks into engagement with the conical end portions of the kingpin ends, and said bearing blocks supporting the spindle independently of the sleeve bearings under normal load and deformable under abnormal load to transfer the load to the sleeve bearings.

5. The assembly of claim 4 wherein the compound radial bearing assembly is carried in a cup-shaped housing press-fitted into the boss of the spindle.

6. A compound radial bearing assembly adapted to be used in automotive kingpin wheel suspensions wherein the kingpin has a cylindrical bearing portion and a tapered bearing portion adjacent said cylindrical portion which comprises a metal, cylindrical bearing adapted to embrace the cylindical portion of the kingpin, a plastic bearing block having a tapered bore adapted to embrace the tapered portion of the kingpin, spring means urging the plastic bearing block onto the tapered portion of the kingpin for holding the cylindrical portion of the kingpin spaced from cylindrical sleeve bearing, and said plastic bearing block being deformable under abnormal loads to accommodate bearing support by the cylindrical sleeve bearing.

7. A compound bearing assembly for supporting in a hollow portion of a housing an end of a shaft having a cylindrical bearing portion terminating in a tapered bearing portion, said assembly comprising a cylindrical sleeve bearing having a bearing surface radially spaced from the cylindrical bearing surface of the end of the shaft, a plastic bearing block having a tapered bearing surface adapted for embracing the tapered end of the shaft adjacent to said sleeve bearing and supporting the shaft independently of said sleeve bearing under normal loads, and resilient means for biasing said plastic bearing block into engagement with the tapered plastic end of the shaft and for compensating for wear therebetween, said plastic bearing block being of a nature to enable relative radial movement of the shaft in said cylindrical sleeve bearing during abnormal loading of said assembly to accommodate bearing support of the shaft by said sleeve bearing.

8. A compound bearing assembly according to claim 7 wherein said plastic bearing block is a split plastic bearing block.

9. A compound bearing assembly according to claim 8 wherein said cylindrical sleeve bearing is a closed end sleeve having a tight fit in the hollow portion of the housing, said plastic bearing block and said resilient means being carried in said sleeve.

10. A compound bearing assembly according to claim 8, wherein said cylindrical sleeve bearing, said plastic bearing block and said resilient means are carried in a closed-end sleeve having a tight fit in the hollow portion of the housing.

References Cited

UNITED STATES PATENTS

| | | | |
|---|---|---|---|
| 2,683,637 | 7/1954 | Skillman | 308—239 |
| 3,301,611 | 1/1967 | Dunlap | 308—35 |
| 3,307,888 | 3/1967 | Dumpis | 308—71 |
| 882,846 | 3/1908 | Sachs | 308—35 X |
| 1,865,202 | 6/1932 | Milligan | 280—96.1 |
| 1,922,355 | 8/1933 | Byerlein | 308—35 |
| 1,961,134 | 6/1934 | Buckwalter | 308—35 X |
| 2,054,228 | 9/1936 | Oelkers et al. | 308—35 X |
| 2,110,425 | 3/1938 | Schroder | 280—96.1 |
| 2,338,224 | 1/1944 | Ash | 280—96.1 |
| 2,340,334 | 2/1944 | Maris | 308—35 X |
| 2,385,170 | 9/1945 | Tedd | 280—96.1 |
| 2,857,214 | 10/1958 | Kogstrom et al. | 308—71 |
| 2,913,251 | 11/1959 | Herbenar | 280—96.1 |
| 3,218,098 | 11/1965 | Rowlett | 308—70 X |
| 3,361,459 | 1/1968 | Marquis et al. | 308—71 X |
| 3,369,848 | 2/1968 | Gerner | 308—71 |

MARTIN P. SCHWADRON, Primary Examiner

L. L. JOHNSON, Assistant Examiner

U.S. Cl. X.R.

280—96.1; 287—93

PO-1050
(5/69)

UNITED STATES PATENT OFFICE
CERTIFICATE OF CORRECTION

Patent No. 3,477,771          Dated November 11, 1969

Inventor(s) Edward J. Herbenar

It is certified that error appears in the above-identified patent and that said Letters Patent are hereby corrected as shown below:

Column 3, line 5, "for" should read --of--;

line 16, "direct" should read --dirt--.

Column 4, line 12, "Disposes" should read --Disposed--.

Column 5, line 49, "sleeve" should be inserted before --bearingline 55, "the" should be inserted before --cylindrical-

SIGNED AND SEALED
APR 14 1970

(SEAL)
Attest:

Edward M. Fletcher, Jr.
Attesting Officer

WILLIAM E. SCHUYLER, JR.
Commissioner of Patents